US012012921B1

(12) United States Patent
Bernier

(10) Patent No.: US 12,012,921 B1
(45) Date of Patent: Jun. 18, 2024

(54) METHOD AND SYSTEM FOR STARTING AN INTERNAL COMBUSTION ENGINE

(71) Applicant: BOMBARDIER RECREATIONAL PRODUCTS INC., Valcourt (CA)

(72) Inventor: Michel Bernier, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 18/351,540

(22) Filed: Jul. 13, 2023

Related U.S. Application Data

(63) Continuation of application No. 17/716,201, filed on Apr. 8, 2022, now Pat. No. 11,739,720, which is a continuation of application No. 17/141,549, filed on Jan. 5, 2021, now Pat. No. 11,352,996, which is a continuation of application No. 15/689,578, filed on Aug. 29, 2017, now Pat. No. 10,900,455, which is a continuation of application No. 15/229,655, filed on Aug. 5, 2016, now Pat. No. 9,845,782, which is a continuation of application No. 14/725,085, filed on May 29, 2015, now abandoned.

(60) Provisional application No. 62/004,524, filed on May 29, 2014.

(51) Int. Cl.
*F02N 11/08* (2006.01)
*F02B 75/04* (2006.01)

(52) U.S. Cl.
CPC .............. *F02N 11/08* (2013.01); *F02B 75/04* (2013.01); *F02N 2250/04* (2013.01)

(58) Field of Classification Search
CPC ....... F02N 11/08; F02N 2250/04; F02B 75/04
See application file for complete search history.

(56) References Cited

U.S. PATENT DOCUMENTS 4,909,200 A * 3/1990 Sumi .................... F02N 15/006 74/6
5,687,682 A 11/1997 Rembold et al.
5,713,320 A 2/1998 Pfaff et al.
6,054,826 A * 4/2000 Murakami ............... B60L 3/04 318/434
6,588,397 B1 7/2003 Sieber
(Continued)

OTHER PUBLICATIONS

1950's Bosch Pendulum Starter solenoid in action; Nov. 26, 2006; retrieved from https://www.youtube.com/watch?v=yPlgxJavng0 on Jun. 29, 2015.
(Continued)

*Primary Examiner* — Sizo B Vilakazi
(74) *Attorney, Agent, or Firm* — BCF LLP

(57) ABSTRACT

A vehicle has a frame, a front suspension assembly, a pair of skis, an endless drive track, and an internal combustion engine. The engine has: a motor-generator having a rotor and a stator, the motor-generator being operable in motor mode and in generator mode; a recoil starter operable to rotate a crankshaft of the engine via the rotor in a same direction as does the motor-generator in generator mode; at least one sensor adapted for sensing at least one engine parameter; and an engine control unit (ECU) receiving a signal from the at least one sensor, the ECU controlling a rotation of the crankshaft by one of the motor-generator and the recoil starter based on the signal. The vehicle also has a display for displaying a message when the crankshaft is to be rotated by the recoil starter.

17 Claims, 9 Drawing Sheets

(56) References Cited

U.S. PATENT DOCUMENTS

| | | | | |
|---|---|---|---|---|
| 8,961,366 | B2 | 2/2015 | Furuya | |
| 11,352,996 | B1 * | 6/2022 | Bernier | F02N 11/08 |
| 2002/0033296 | A1 | 3/2002 | Ohyama et al. | |
| 2003/0101956 | A1 | 6/2003 | Sieber | |
| 2004/0060530 | A1 * | 4/2004 | Mitani | F02N 11/08 123/179.3 |
| 2004/0226530 | A1 | 11/2004 | Kojima | |
| 2005/0109302 | A1 * | 5/2005 | Tetsuno | F02N 99/006 123/179.5 |
| 2005/0119076 | A1 | 6/2005 | Chonan et al. | |
| 2006/0128521 | A1 * | 6/2006 | Fukushima | B60W 10/107 477/5 |
| 2007/0204827 | A1 * | 9/2007 | Kishibata | F02N 19/005 123/179.5 |
| 2008/0105230 | A1 * | 5/2008 | Kishibata | F02N 11/0803 123/179.5 |
| 2009/0056665 | A1 * | 3/2009 | Yamazaki | F02N 19/005 123/185.3 |
| 2009/0114181 | A1 * | 5/2009 | Okabe | F02N 3/02 123/185.3 |
| 2014/0008092 | A1 | 1/2014 | Yanagihara | |
| 2014/0096988 | A1 | 4/2014 | Hirabayashi et al. | |
| 2014/0287870 | A1 | 9/2014 | Furuya et al. | |
| 2015/0258882 | A1 | 9/2015 | Holmes et al. | |
| 2018/0180012 | A1 * | 6/2018 | Yoshida | B60W 10/08 |

OTHER PUBLICATIONS

1950's Bosch Pendulum Starter in motion; Nov. 26, 2006; retrieved from https://www.youtube.com/watch?v=sA9Yh_upkE8 on Jun. 29, 2015.

Wikipedia; Maicoletta; retrieved from https://en.wikipedia.org/wiki/Maicoletta on Jun. 29, 2015.

Wikipedia; Starter; retrieved from https://wikipedia.qwika.com/de2en/Anlasser on Jun. 29, 2015.

Memim Encyclopedia; Starter (engine); retrieved from https://memim.com/starter-engine.html on Jun. 29, 2015.

* cited by examiner

METHOD AND SYSTEM FOR STARTING AN INTERNAL COMBUSTION ENGINE

CROSS-REFERENCE

The present application is a continuation of U.S. application Ser. No. 17/716,201, filed Apr. 8, 2022, which is a continuation of U.S. application Ser. No. 17/141,549, filed Jan. 5, 2021, now U.S. Pat. No. 11,352,996, which is a continuation application of U.S. application Ser. No. 15/689,578, filed Aug. 29, 2017, now U.S. Pat. No. 10,900,455, which is a continuation application of U.S. application Ser. No. 15/229,655, filed Aug. 5, 2016, now U.S. Pat. No. 9,845,782, which is a continuation application of U.S. application Ser. No. 14/725,085, filed May 29, 2015, which claims priority to U.S. Provisional Patent Application No. 62/004,524, filed May 29, 2014, the entirety of all of which is incorporated herein by reference.

FIELD OF TECHNOLOGY

The present technology relates to a method and system for starting an internal combustion engine.

BACKGROUND

In order to start the internal combustion engine of small vehicles, such as a snowmobile, a recoil starter is sometimes provided. To start the engine, the user pulls on a rope of the recoil starter which causes the crankshaft of the engine to turn. If the crankshaft turns fast enough, the engine can be started. If not, the rope needs to be pulled again until the engine starts.

In order to facilitate the starting of the engine, some vehicles have been provided with an electric starting system. This system consists of an electric motor, known as a starter motor, which engages and turns a ring gear connected to the crankshaft when an ignition key is turned or a start button is pushed by the user. The starter motor turns the crankshaft fast enough to permit the starting of the engine, and once the engine has started, disengages the ring gear and is turned off.

Although it is very convenient for the user, electric starting systems of the type described above have some drawbacks. The starter motor and its associated components add weight to the vehicle. As would be understood, additional weight reduces the fuel efficiency of the vehicle, affects handling of the vehicle and, in the case of snowmobiles, makes it more difficult for the snowmobile to ride on top of snow. These electric starting systems also require additional assembly steps when manufacturing the snowmobile and take up room inside the vehicle.

The vehicle has a battery to supply electric current to the starter motor in order to turn the crankshaft. To recharge the battery and to provide the electric current necessary to operate the various components of the vehicle once the engine has started, an electrical generator is operatively connected to the crankshaft of the engine. As the crankshaft turns the rotor of the electrical generator, the generator generates electricity.

In recent years, some vehicles have been provided with starter-generator units which replace the starter motor and the electrical generator. The starter-generator is operatively connected to the crankshaft in a manner similar to the aforementioned electrical generator. The starter-generator unit can be used in a starter mode or a generator mode. In the starter mode, by applying current to the starter-generator unit, the starter-generator unit turns the crankshaft to enable starting of the engine. In the generator mode, the rotation of the crankshaft as the engine operates causes the starter-generator to generate electricity. As would be understood, the use of such systems addresses some of the deficiencies of starting systems using separate starter motors and electrical generators.

In order to start the engine, the torque applied to the crankshaft to make it turn has to be sufficiently large to overcome the compression inside the engine's cylinders resulting from the pistons moving up in their respective cylinders as the crankshaft rotates. In order to provide this amount of torque, the starter-generator unit needs to be bigger to properly operate in the starter mode than it would have to be if it was to be used only as an electrical generator. As such, the starter-generator is also heavier than it would have to be if it was to be used only as an electrical generator.

There is therefore a need for a method and system for starting and internal combustion engine that address at least some of the above inconveniences.

SUMMARY

It is an object of the present technology to ameliorate at least some of the inconveniences present in the prior art.

The present technology provides an electrical engine starting system and a method for starting the engine that uses an electrical actuator connected to the crankshaft to start the engine. The method permits the use of an electrical actuator that is selected so as to be able to provide sufficient torque to turn the crankshaft from rest, but not enough torque so that it could turn the crankshaft by one full rotation from rest and overcome the compression forces inside the cylinders that are exerted on the pistons as the crankshaft turns and the pistons move up in their respective cylinders. As such, the electrical actuator does not have to be as large and heavy as it would otherwise have to be in order to turn the crankshaft by one full rotation from rest. In order to start the engine, the electrical actuator moves the crankshaft back and forth, thereby making the crankshaft oscillate. As the crankshaft oscillates, it gains momentum. As the crankshaft oscillates, the reciprocations of the pistons cause combustion gases present in the combustion chamber to be purged from the combustion chambers via the exhaust ports of the engine and these gases are replaced with fresh air. Once the crankshaft has gained sufficient momentum and fresh air is present in the combustion chambers, fuel is injected and ignited in the combustions chambers as will be described below in order to start the engine. In some implementations of the present technology, the electrical actuator is a motor-generator. It is also contemplated that an electric motor that does not provide a generator function could be used. Although the method permits the use of an electrical actuator that is selected so as to be able to provide sufficient torque to turn the crankshaft from rest, but not enough torque so that it could turn the crankshaft by one full rotation from rest and overcome the compression forces inside the cylinders that are exerted on the pistons as the crankshaft turns and the pistons move up in their respective cylinders, it is contemplated that the method could also be used with an electrical actuator that would be able to provide sufficient torque to turn the crankshaft by one full rotation from rest.

According to one aspect of the present technology, there is provided a vehicle having: a frame having a tunnel, an engine cradle portion and a front suspension assembly portion; a front suspension assembly connected to the front suspension assembly portion; a pair of skis connected to the front suspension assembly; an endless drive track disposed at least in part under the tunnel; and an internal combustion engine supported by the engine cradle portion and operatively connected to the endless drive track. The internal combustion engine has: at least one cylinder; at least one cylinder head connected to at least one cylinder; at least one piston disposed in the at least one cylinder; a crankshaft operatively connected to the at least one piston; a crankcase housing at least a portion of the crankshaft; a motor-generator comprising a rotor rotationally fixed to the crankshaft and a stator disposed around the crankshaft, the rotor and the stator being co-axial with the crankshaft, the rotor extending radially outward of the stator, the rotor partially housing the stator, the motor-generator being operable in motor mode to rotate the crankshaft about an axis and in generator mode to generate electricity; a recoil starter selectively operatively connected to the rotor, the recoil starter operable to rotate the crankshaft via the rotor in a same direction as does the motor-generator in generator mode, the motor-generator being disposed between the recoil starter and the crankcase in a direction of the axis, at least a portion of the rotor being disposed between the recoil starter and the stator in the direction of the axis; a drive pulley of a continuously variable transmission (CVT) operatively connected to the crankshaft, the motor-generator, the recoil starter, the crankshaft and the drive pulley being coaxial; at least one sensor adapted for sensing at least one engine parameter; and an engine control unit receiving a signal from the at least one sensor, the engine control unit controlling a rotation of the crankshaft by one of the motor-generator and the recoil starter based on the signal received from the at least one sensor. The vehicle also has a display adapted for receiving a display signal sent by the engine control unit and for displaying a corresponding message. The display signal is sent in response to the signal being received by the engine control unit from the at least one sensor. The message is displayed when the crankshaft is to be rotated by the recoil starter.

In some implementations, the engine control unit sends a signal to the motor-generator to rotate the crankshaft only when the recoil starter is in a wound state.

In some implementations, the at least one engine parameter includes an amount of time elapsed after stopping of the internal combustion engine. The display signal is sent when the amount of time is greater than a predetermined amount of time.

In some implementations, the at least one engine parameter includes an engine temperature. The display signal is sent when the engine temperature is less than a predetermined temperature.

In some implementations, the motor-generator and the drive pulley are disposed on opposite sides of the crankcase.

In some implementations, the recoil starter and the drive pulley are disposed on opposite sides of the crankcase.

In some implementations, a housing is removably attached to the crankcase. The motor-generator is disposed at least in part inside the housing.

In some implementations, a cover is mounted to an end of the housing opposite from the crankcase. The recoil starter is positioned between the cover and the motor-generator.

In some implementations, the recoil starter has a rope selectively wound on a reel. The reel is selectively operatively connected to the rotor. An end of the crankshaft is disposed between the crankcase and at least a portion of the rope selectively wound on the reel. At least the portion of the rope selectively wound on the reel is offset from the end of the crankshaft.

In some implementations, the motor-generator operates in motor mode to rotate the crankshaft in a reverse direction and to rotate the crankshaft in a forward direction. The recoil starter operates to rotate the crankshaft in the forward direction.

In some implementations, the at least one cylinder, the at least one cylinder head and the at least one piston define a variable volume combustion chamber therebetween. The internal combustion engine also has: a fuel injector mounted to the cylinder head and adapted for injecting fuel in the variable volume combustion chamber when the crankshaft is rotating in a forward direction; and a spark plug adapted to ignite the fuel in the variable volume combustion chamber.

In some implementations, the motor-generator operates in generator mode when the crankshaft rotates in a forward direction.

In some implementations, the at least one engine parameter is selected from the group consisting of an engine temperature, an air intake temperature, an atmospheric air pressure, an exhaust temperature, an exhaust pressure and a time elapsed after stopping of the internal combustion engine.

In some implementations, the stator is in a fixed position relative to the internal combustion engine. The recoil starter is adapted for engaging the rotor to simultaneously rotate the rotor and the crankshaft.

In some implementations, the recoil starter is adapted for rotating the rotor in the same direction as does the motor-generator in generator mode and for causing the motor-generator to operate in generator mode. The motor-generator is adapted for rotating the crankshaft in motor mode in the same direction as in generator mode.

In some implementations, the motor-generator is further adapted to receive power from a capacitor for rotating the crankshaft in the same direction as in generator mode.

In some implementations, the recoil starter is selectively operatively connected to the rotor at a position radially offset from the crankshaft on the portion of the rotor.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The method and system for starting an internal combustion engine will be described with respect to a snowmobile 10. However, it is contemplated that the method and system could be used in other vehicles, such as, but not limited to, on-road vehicles, off-road vehicles, a motorcycle, a scooter, a three-wheel road vehicle, a boat powered by an outboard engine or an inboard engine, and an all-terrain vehicle (ATV). It is also contemplated that the method and system could be used in devices other than vehicles that have an internal combustion engine such as a generator. The method and system will also be described with respect to a two-stroke, inline, two-cylinder internal combustion engine 24. However, it is contemplated that the method and system could be used with an internal combustion engine having more than two cylinders or having a configuration other than inline, such as a V-type engine.

Figure 1:
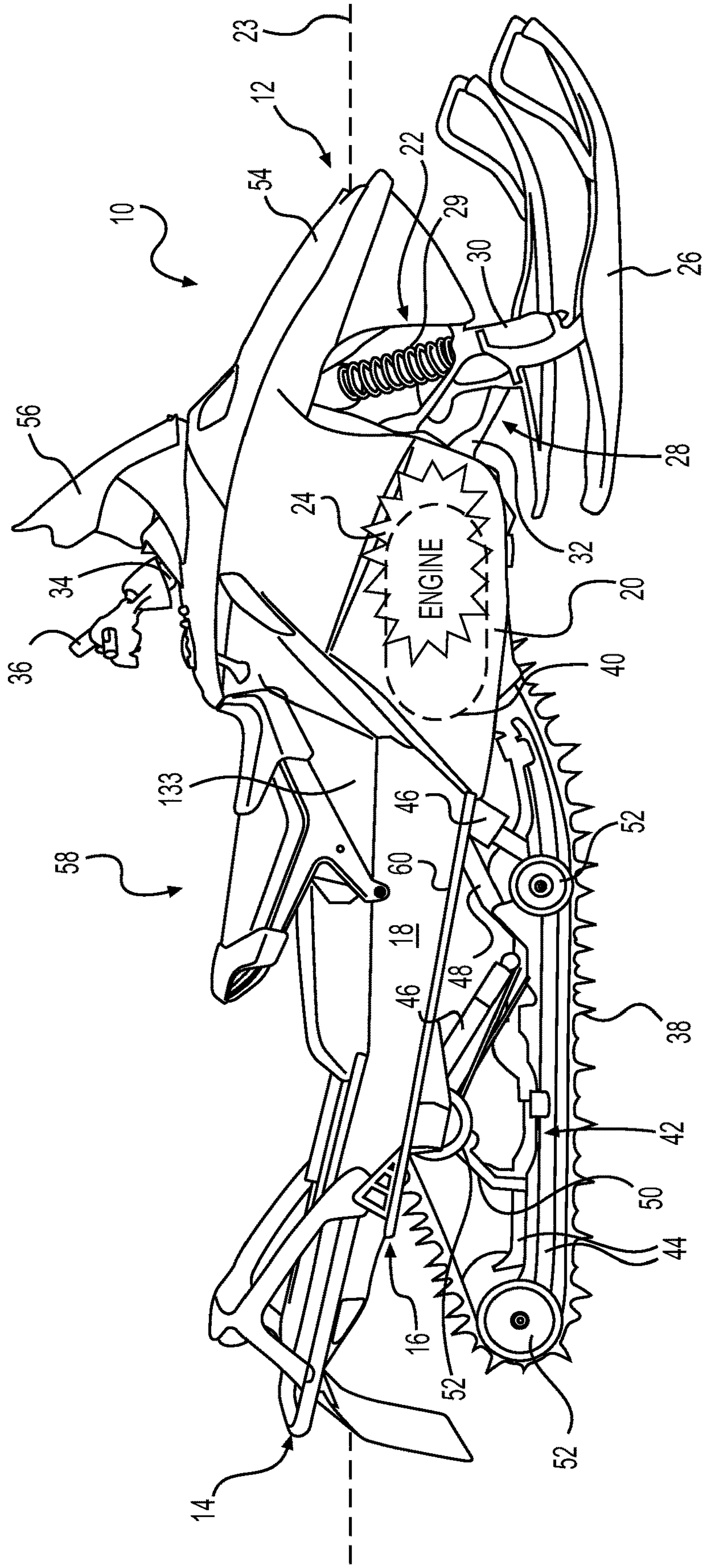
FIG. 1 is a right side perspective view of a snowmobile.

Turning now to FIG. 1, a snowmobile 10 includes a forward end 12 and a rearward end 14 that are defined consistently with a forward travel direction of the snowmobile 10. The snowmobile 10 includes a frame 16 that has a tunnel 18, an engine cradle portion 20 and a front suspension assembly portion 22. The tunnel 18 consists of one or more pieces of sheet metal arranged to form an inverted U-shape that is connected at the front to the engine cradle portion 20 and extends rearward therefrom along the longitudinal axis 23. An internal combustion engine 24 (schematically illustrated in FIG. 1) is carried by the engine cradle portion 20 of the frame 16. The internal combustion engine 24 is described in greater detail below. Two skis 26 are positioned at the forward end 12 of the snowmobile 10 and are attached to the front suspension assembly portion 22 of the frame 16 through a front suspension assembly 28. The front suspension assembly 28 includes shock absorber assemblies 29, ski legs 30, and supporting arms 32. Ball joints and steering rods (not shown) operatively connect the skis 26 to a steering column 34. A steering device in the form of handlebar 36 is attached to the upper end of the steering column 34 to allow a driver to rotate the ski legs 30 and thus the skis 26, in order to steer the snowmobile 10.

An endless drive track 38 is disposed generally under the tunnel 18 and is operatively connected to the engine 24 through a CVT 40 (schematically illustrated by broken lines in FIG. 1) which will be described in greater detail below. The endless drive track 38 is driven to run about a rear suspension assembly 42 for propulsion of the snowmobile 10. The rear suspension assembly 42 includes a pair of slide rails 44 in sliding contact with the endless drive track 38. The rear suspension assembly 42 also includes a plurality of shock absorbers 46 which may further include coil springs (not shown) surrounding one or more of the shock absorbers 46. Suspension arms 48 and 50 are provided to attach the slide rails 44 to the frame 16. A plurality of idler wheels 52 are also provided in the rear suspension assembly 42. Other types and geometries of rear suspension assemblies are also contemplated.

At the forward end 12 of the snowmobile 10, fairings 54 enclose the engine 24 and the CVT 40, thereby providing an external shell that protects the engine 24 and the CVT 40. The fairings 54 include a hood and one or more side panels that can be opened to allow access to the engine 24 and the CVT 40 when this is required, for example, for inspection or maintenance of the engine 24 and/or the CVT 40. A windshield 56 is connected to the fairings 54 near the forward end 12 of the snowmobile 10. Alternatively the windshield 56 could be connected directly to the handlebar 36. The windshield 56 acts as a wind screen to lessen the force of the air on the driver while the snowmobile 10 is moving forward.

A straddle-type seat 58 is positioned over the tunnel 18. Two footrests 60 are positioned on opposite sides of the snowmobile 10 below the seat 58 to accommodate the driver's feet.

Turning now to FIGS. 2 to 5, the internal combustion engine 24 and the CVT 40 will be described. The internal combustion engine 24 operates on the two-stroke principle. The engine 24 has a crankshaft 100 that rotates about a horizontally disposed axis that extends generally transversely to the longitudinal axis 23 of the snowmobile 10. The crankshaft drives the CVT 40 for transmitting torque to the endless drive track 38 for propulsion of the snowmobile 10.

The CVT 40 includes a drive pulley 62 coupled to the crankshaft 100 to rotate with the crankshaft 100 and a driven pulley (not shown) coupled to one end of a transversely mounted jackshaft (not shown) that is supported on the frame 16 through bearings. The opposite end of the transversely mounted jackshaft is connected to the input member of a reduction drive (not shown) and the output member of the reduction drive is connected to a drive axle (not shown) carrying sprocket wheels (not shown) that form a driving connection with the drive track 38.

The drive pulley 62 of the CVT 40 includes a pair of opposed frustoconical belt drive sheaves 64 and 66 between which a drive belt (not shown) is located. The drive belt is made of rubber, but it is contemplated that it could be made of metal linkages or of a polymer. The drive pulley 62 will be described in greater detail below. The driven pulley includes a pair of frustoconical belt drive sheaves between which the drive belt is located. The drive belt is looped around both the drive pulley 62 and the driven pulley. The torque being transmitted to the driven pulley provides the necessary clamping force on the drive belt through its torque sensitive mechanical device in order to efficiently transfer torque to the other powertrain components.

Figure 5:
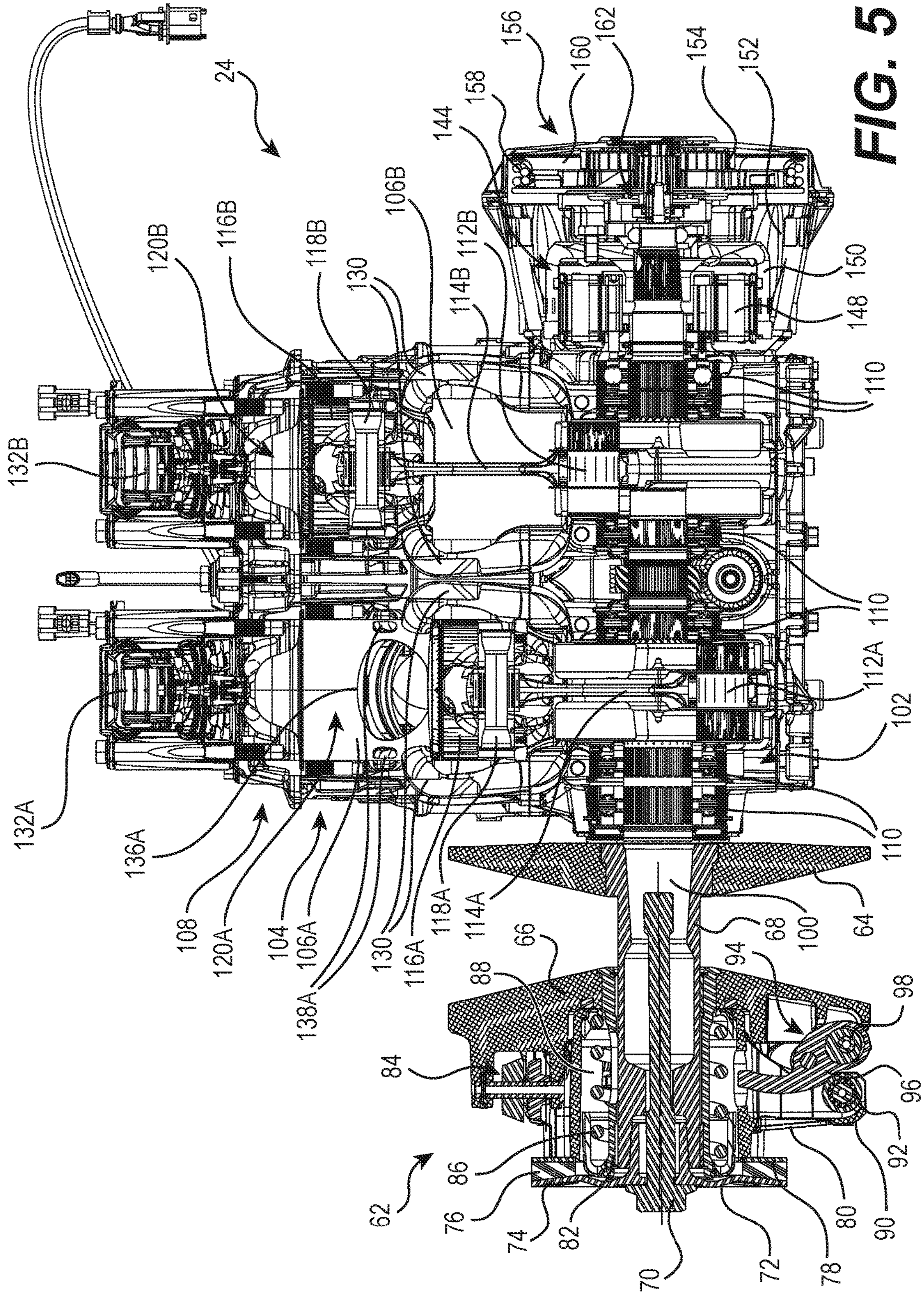
FIG. 5 is a cross-sectional view of the engine of FIG. 2 taken through line 5-5 of FIG. 4 with a drive pulley of a CVT mounted on a crankshaft of the engine.

As discussed above, the drive pulley 62 includes a pair of opposed frustoconical belt drive sheaves 64 and 66 as can be seen in FIG. 5. Both sheaves 64 and 66 rotate together with the crankshaft 100. The sheave 64 is fixed in an axial direction relative to the crankshaft 100, and is therefore referred to as the fixed sheave 64. The fixed sheave 64 is also rotationally fixed relative to the crankshaft 100. The sheave 66 can move toward or away from the fixed sheave 64 in the axial direction of the crankshaft 100 in order to change the drive ratio of the CVT 40, and is therefore referred to as the movable sheave 66. As can be seen in FIG. 5, the fixed sheave 64 is disposed between the movable sheave 66 and the engine 24.

The fixed sheave 64 is mounted on a fixed sheave shaft 68. The fixed sheave 64 is press-fitted on the fixed sheave shaft 68 such that the fixed sheave 64 rotates with the fixed sheave shaft 68. It is contemplated that the fixed sheave 64 could be connected to the fixed sheave shaft 68 in other known manners to make the fixed sheave 64 rotationally and axially fixed relative to the fixed sheave shaft 68. As can be seen in FIG. 5, the fixed sheave shaft 68 is hollow and has a tapered hollow portion. The tapered hollow portion receives the end of the crankshaft 100 therein to transmit torque from the engine 24 to the drive pulley 62. A fastener 70 is inserted in the outer end (i.e. the left side with respect to FIG. 5) of the drive pulley 62, inside the fixed sheave shaft 68, and screwed into the end of the crankshaft 100 to prevent axial displacement of the fixed sheave shaft 68 relative to the crankshaft 100. It is contemplated that the fixed sheave shaft 68 could be connected to the crankshaft 100 in other known manners to make the fixed sheave shaft 68 rotationally and axially fixed relative to the crankshaft 100. It is also contemplated that the crankshaft 100 could be the fixed sheave shaft 68.

A cap 72 is taper-fitted in the outer end of the fixed sheave shaft 68. The fastener 70 is also inserted through the cap 72 to connect the cap 72 to the fixed sheave shaft 68. It is contemplated that the cap 72 could be connected to the fixed sheave shaft 68 by other means. The radially outer portion of the cap 72 forms a ring 74. An annular rubber damper 76 is connected to the ring 74. Another ring 78 is connected to the rubber damper 76 such that the rubber damper 76 is disposed between the rings 74, 78. In the present implementation, the rubber damper 76 is vulcanized to the rings 74, 78, but it is contemplated that they could be connected to each other by other means such as by using an adhesive for example. It is also contemplated that the damper 76 could be made of a material other than rubber.

A spider 80 is disposed around the fixed sheave shaft 68 and axially between the ring 78 and the movable sheave 66. The spider 80 is axially fixed relative to the fixed sheave 64. Apertures (not shown) are formed in the ring 74, the damper 76, and the ring 78. Fasteners (not shown) are inserted through the apertures in the ring 74, the damper 76, the ring 78 and the spider 80 to fasten the ring 78 to the spider 80. As a result, torque is transferred between the fixed sheave shaft 68 and the spider 80 via the cap 72, the rubber damper 76 and the ring 78. The damper 76 dampens the torque variations from the fixed sheave shaft 68 resulting from the combustion events in the engine 24. The spider 80 therefore rotates with the fixed sheave shaft 68.

A movable sheave shaft 82 is disposed around the fixed sheave shaft 68. The movable sheave 66 is press-fitted on the movable sheave shaft 82 such that the movable sheave 66 rotates and moves axially with the movable sheave shaft 82. It is contemplated that the movable sheave 66 could be connected to the movable sheave shaft 82 in other known manners to make the movable sheave 66 rotationally and axially fixed relative to the shaft 82. It is also contemplated that the movable sheave 66 and the movable sheave shaft 82 could be integrally formed.

To transmit torque from the spider 80 to the movable sheave 104, a torque transfer assembly consisting of three roller assemblies 84 connected to the movable sheave 66 is provided. The roller assemblies 84 engage the spider 80 so as to permit low friction axial displacement of the movable sheave 66 relative to the spider 80 and to eliminate, or at least minimize, rotation of the movable sheave 66 relative to the spider 80. As described above, torque is transferred from the fixed sheave 64 to the spider 80 via the damper 76. The spider 80 engages the roller assemblies 84 which transfer the torque to the movable sheave 66 with no, or very little, backlash. As such, the spider 80 is considered to be rotationally fixed relative to the movable sheave 66. It is contemplated that in some implementations, the torque transfer assembly could have more or less than three roller assemblies 84.

As can be seen in FIG. 5, a biasing member in the form of a coil spring 86 is disposed inside a cavity 88 defined radially between the movable sheave shaft 82 and the spider 80. As the movable sheave 66 and the movable sheave shaft 82 move axially toward the fixed sheave 64, the spring 86 gets compressed. The spring 86 biases the movable sheave 66 and the movable sheave shaft 82 away from the fixed sheave 64 toward their position shown in FIG. 5. It is contemplated that, in some implementations, the movable sheave 66 could be biased away from the fixed sheave 64 by mechanisms other than the spring 86.

The spider 80 has three arms 90 disposed at 120 degrees from each other. Three rollers 92 are rotatably connected to the three arms 90 of the spider 80. Three centrifugal actuators 94 are pivotally connected to three brackets (not shown) formed by the movable sheave 66. Each roller 92 is aligned with a corresponding one of the centrifugal actuators 94. Since the spider 80 and the movable sheave 66 are rotationally fixed relative to each other, the rollers 92 remain aligned with their corresponding centrifugal actuators 94 when the shafts 68, 82 rotate. The centrifugal actuators 94 are disposed at 120 degrees from each other. The centrifugal actuators 94 and the roller assemblies 84 are arranged in an alternating arrangement and are disposed at 60 degrees from each other. It is contemplated that the rollers 92 could be pivotally connected to the brackets of the movable sheave 66 and that the centrifugal actuators 94 could be connected to the arms 90 of the spider 80. It is also contemplated that there could be more or less than three centrifugal actuators 94, in which case there would be a corresponding number of arms 90, rollers 92 and brackets of the movable sheave. It is also contemplated that the rollers 92 could be omitted and replaced with surfaces against which the centrifugal actuators 94 can slide as they pivot.

In the present implementation, each centrifugal actuator 94 includes an arm 96 that pivots about an axle 98 connected to its respective bracket of the movable sheave 66. The position of the arms 96 relative to their axles 98 can be adjusted. It is contemplated that the position of the arms 96 relative to their axles 98 could not be adjustable. Additional detail regarding centrifugal actuators of the type of the centrifugal actuator 94 can be found in International Patent Publication No. WO2013/032463 A2, published Mar. 7, 2013, the entirety of which is incorporated herein by reference.

The above description of the drive pulley 62 corresponds to one contemplated implementation of a drive pulley that can be used with the engine 24. Additional detail regarding drive pulleys of the type of the drive pulley 62 can be found in International Patent Application No. PCT/IB2015/052374, filed Mar. 31, 2015, the entirety of which is incorporated herein by reference. It is contemplated that other types of drive pulleys could be used.

Figure 2:
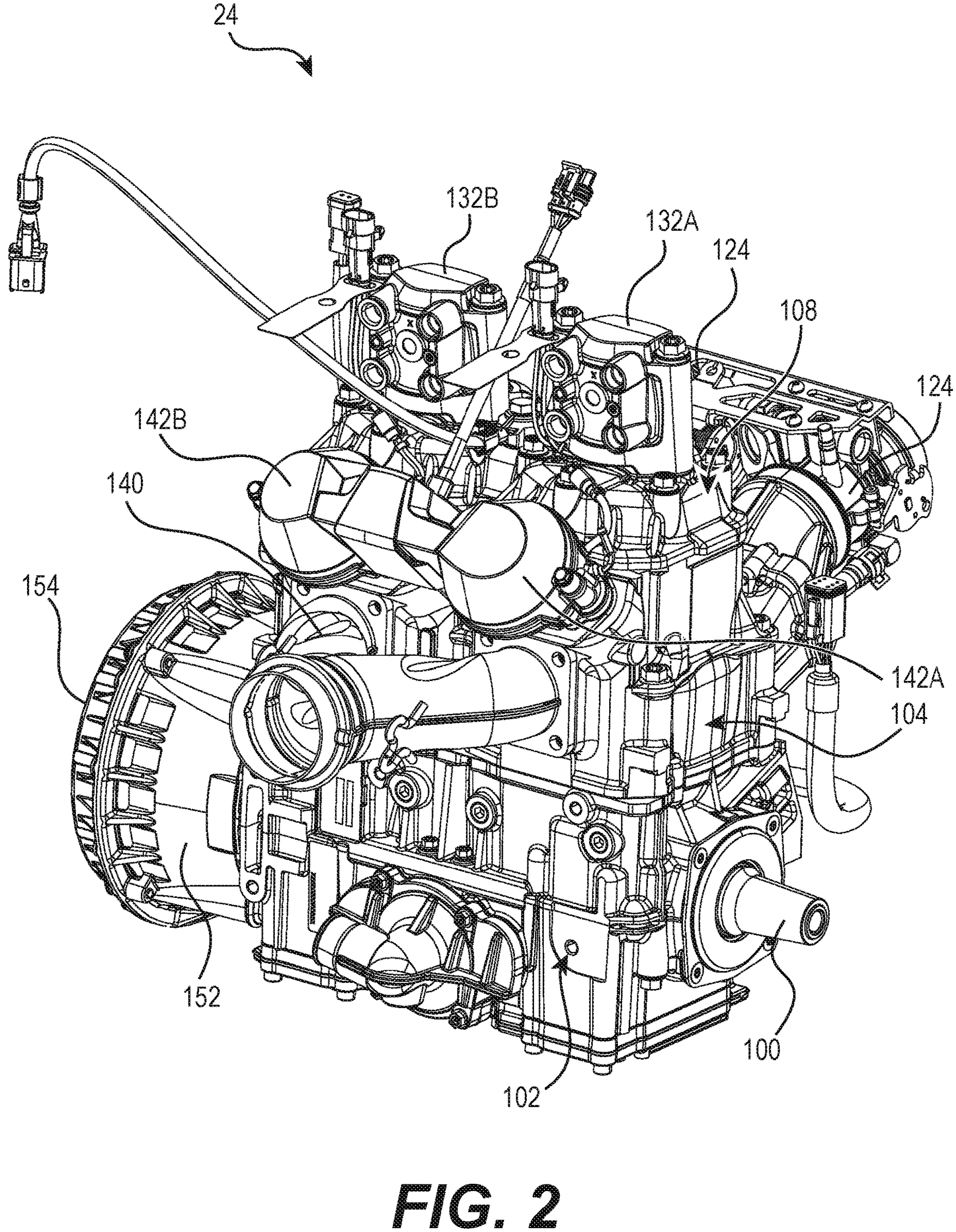
FIG. 2 is a perspective view taken from a front, left side of the internal combustion engine of the snowmobile of FIG. 1.
Figure 3:
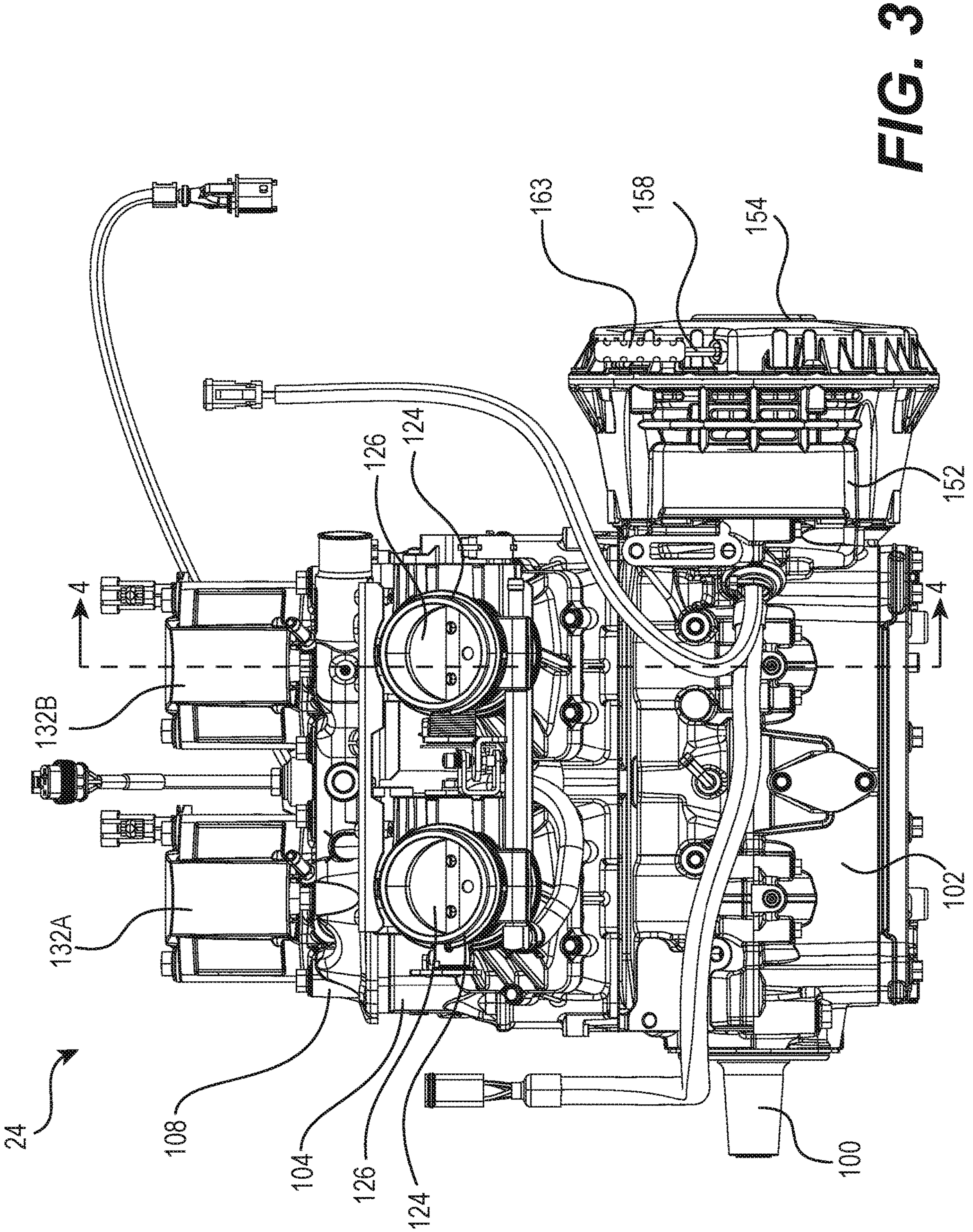
FIG. 3 is a rear elevation view of the engine of FIG. 2.

The engine 24 has a crankcase 102 housing a portion of the crankshaft 100. As can be seen in FIGS. 2, 3 and 5, the crankshaft 100 protrudes from the crankcase 102. It is contemplated that the crankshaft 100 could drive an output shaft connected directly to the end of the crankshaft 100 or offset from the crankshaft 100 and driven by driving means such as gears in order to drive the drive pulley 62. It is also contemplated that the crankshaft 100 could drive, using gears for example, a counterbalance shaft housed in part in the crankcase 102 and that the drive pulley 62 could be connected to the counterbalance shaft, in which case, the crankshaft 100 does not have to protrude from the crankcase 102 for this purpose. A cylinder block 104 is disposed on top of and connected to the crankcase 102. The cylinder block 104 defines two cylinders 106A, 106B (FIG. 5). A cylinder head 108 is disposed on top of and is connected to the cylinder block 104.

As best seen in FIG. 5, the crankshaft 100 is supported in the crankcase 102 by bearings 110. The crankshaft 100 has two crank pins 112A, 112B. In the illustrated implementation where the two cylinders 106A, 106B are disposed in line, the crank pins 112A, 112B are provided at 180 degrees from each other. It is contemplated that the crank pins 112A, 112B could be provided at other angles from each other to account for other cylinder arrangements, such as in a V-type engine. A connecting rod 114A is connected to the crank pin 112A at one end and to a piston 116A via a piston pin 118A at the other end. As can be seen, the piston 116A is disposed in the cylinder 106A. Similarly, a connecting rod 114B is connected to the crank pin 112B at one end and to a piston 116B via a piston pin 118B at the other end. As can be seen, the piston 116B is disposed in the cylinder 106B. Rotation of the crankshaft 100 causes the pistons 116A, 116B to reciprocate inside their respective cylinders 106A, 106B. The cylinder head 108, the cylinder 106A and the piston 116A define a variable volume combustion chamber 120A therebetween. Similarly, the cylinder head 108, the cylinder 106B and the piston 116B define a variable volume combustion chamber 120B therebetween. It is contemplated that the cylinder block 104 could define more than two cylinders 106, in which case the engine 24 would be provided with a corresponding number of pistons 116 and connecting rods 114.

Figure 4:
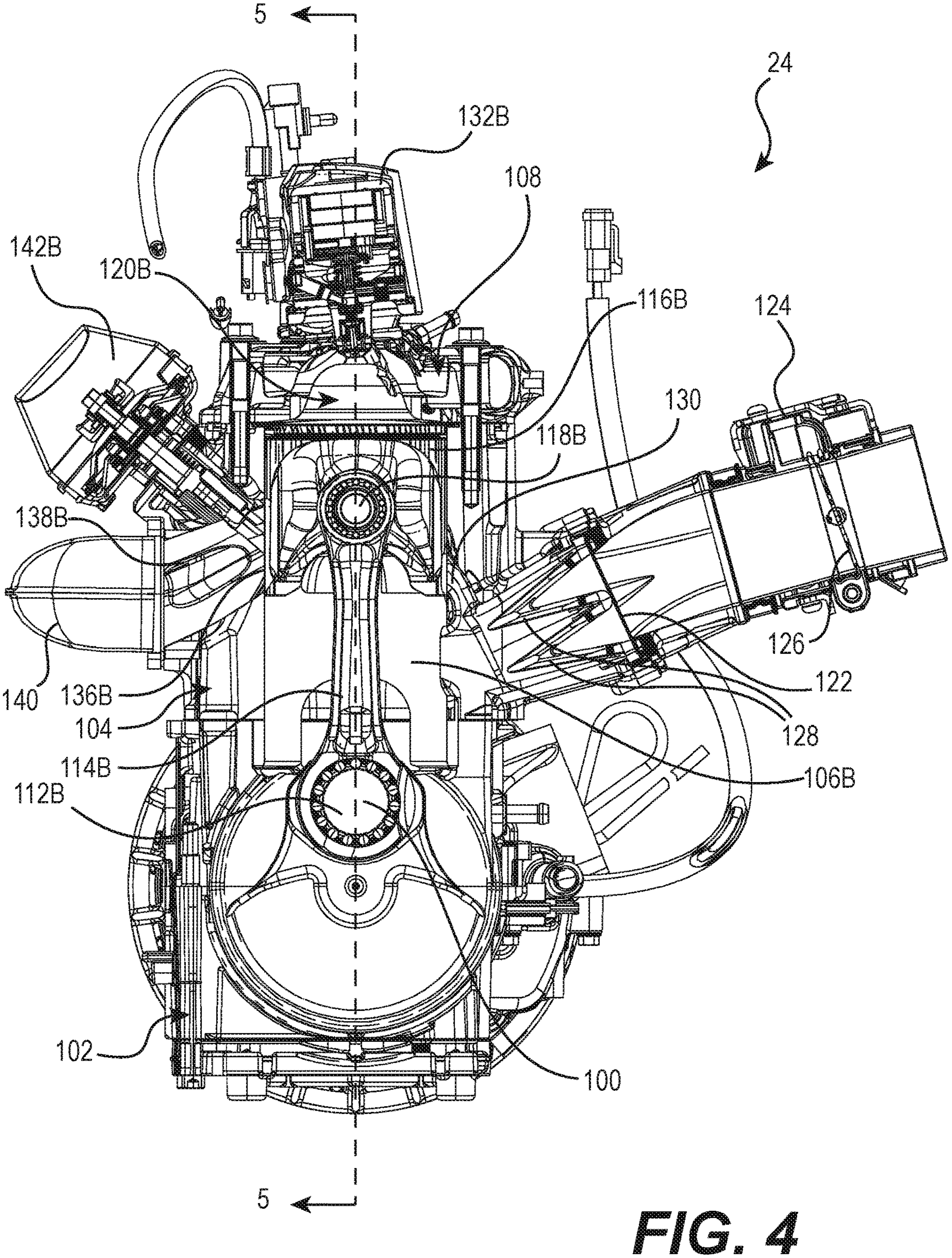
FIG. 4 is a cross-sectional view of the engine of FIG. 2 taken through line 4-4 of FIG. 3.

Air is supplied to the crankcase 102 via a pair of air intake ports 122 (only one of which is shown in FIG. 4) formed in the back of the cylinder block 104. A pair of throttle bodies 124 is connected to the pair of air intake ports 122. Each throttle body 124 has a throttle plate 126 that can be rotated to control the air flow to the engine 24. Motors (not shown) are used to change the position of the throttle plates 126, but it is contemplated that throttle cables connected to a throttle lever could be used. It is also contemplated that a single motor could be used to change the position of both throttle plates 126. A pair of reed valves 128 (FIG. 4) are provided in each intake port 122. The reed valves 128 allow air to enter the crankcase 102, but prevent air from flowing out of the crankcase 102 via the air intake ports 122.

As the pistons 116A, 116B reciprocate, air from the crankcase 102 flows into the combustion chambers 120A, 120B via scavenge ports 130. Fuel is injected in the combustion chambers 120A, 120B by fuel injectors 132A, 132B respectively. The fuel injectors 132A, 132B are mounted to the cylinder head 108. The fuel injectors 132A, 132B are connected by fuel lines and/or rails (not shown) to one or more fuel pumps (not shown) that pump fuel from a fuel tank 133 (FIG. 1) of the snowmobile 10. In the illustrated implementation, the fuel injectors 132A, 132B are E-TEC™ fuel injectors, however other types of injectors are contemplated. The fuel-air mixture in the combustion chamber 120A, 120B is ignited by spark plugs 134A, 134B respectively (not shown in FIGS. 2 to 5, but schematically illustrated in FIG. 6). The spark plugs 134A, 134B are mounted to the cylinder head 108.

To evacuate the exhaust gases resulting from the combustion of the fuel-air mixture in the combustion chambers 120A, 120B, each cylinder 116A, 116B defines one main exhaust port 136A, 136B respectively and two auxiliary exhaust ports 138A, 138B respectively. It is contemplated that each cylinder 116A, 116B could have only one, two or more than three exhaust ports. The exhaust ports 136A, 136B, 138A, 138B are connected to an exhaust manifold 140. The exhaust manifold is connected to the front of the cylinder block 104. Exhaust valves 142A, 142B mounted to the cylinder block 104, control a degree of opening of the exhaust ports 136A, 136B, 138A, 138B. In the present implementation, the exhaust valves 142A, 142B are R.A.V.E.™ exhaust valves, but other types of valves are contemplated. It is also contemplated that the exhaust valves 142A, 142B could be omitted.

An electrical actuator is connected to the end of the crankshaft 100 opposite the end of the crankshaft 100 that is connected to the drive pulley 62. In the present implementation, the electrical actuator is a motor-generator 144 (FIG. 5), and more specifically a brushless direct current motor-generator 144. It is contemplated that other types of motor-generators could be used. It is also contemplated that the electrical actuator could only be a motor, in which case the engine 24 would be provided with a separate generator. It is also contemplated that the motor-generator 144 could be connected to another shaft operatively connected to the crankshaft 100, by gears for example. The motor-generator 144, as its name suggests, can act as a motor or as a generator and can be switched between either modes. In the motor mode, the motor-generator 144 is powered by a battery 146 (FIG. 6) or a high capacity capacitor and turns the crankshaft 100. In the generator mode, the motor-generator 144 is turned by the crankshaft 100 and generates electricity that is supplied to the battery 146 (or the capacitor) and to other electrical components of the engine 24 and the snowmobile 10.

As can be seen in FIG. 5, the motor-generator 144 has a stator 148 and a rotor 150. The stator 148 is disposed around the crankshaft 100 outside of the crankcase 102 and is fastened to the crankcase 102. The rotor 150 is connected by splines to the end of the crankshaft 100 and partially houses the stator 148. A housing 152 is disposed over the motor-generator 144 and is connected to the crankcase 102. A cover 154 is connected to the end of the housing 152.

As can also be seen in FIG. 5, a recoil starter 156 is disposed inside the space defined by the housing 152 and the cover 154, between the cover 154 and the motor-generator 144. The recoil starter 156 has a rope 158 wound around a reel 160. A ratcheting mechanism 162 selectively connects the reel 160 to the rotor 150. To start the engine 24 using the recoil starter 156, a user pulls on a handle 163 (FIG. 3) connected to the end of the rope 158. This turns the reel 160 in a direction that causes the ratcheting mechanism 162 to lock, thereby turning the rotor 150 and the crankshaft 100. The rotation of the crankshaft 100 causes the pistons 116A, 116B to reciprocate which permits fuel injection and ignition to occur, thereby starting the engine 24. When the engine 24 starts, the rotation of the crankshaft 100 relative to the reel 160 disengages the ratcheting mechanism 162, and as such the crankshaft 100 does not turn the reel 160. When the user releases the handle, a spring (not shown) turns the reel 160 thereby winding the rope 158 around the reel 160.

In the present implementation, the drive pulley 62 and the motor-generator 144 are both mounted to the crankshaft 100. It is contemplated that the drive pulley 62 and the motor-generator 144 could both be mounted to a shaft other than the crankshaft 100, such as a counterbalance shaft for example. In the present implementation, the drive pulley 62, the motor-generator 144 and the recoil starter 56 are all coaxial with and rotate about the axis of rotation of the crankshaft 100. It is contemplated that the drive pulley 62, the motor-generator 144 and the recoil starter 56 could all be coaxial with and rotate about the axis of rotation of a shaft other than the crankshaft 100, such as a counterbalance shaft for example. It is also contemplated that at least one of the drive pulley 62, the motor-generator 144 and the recoil starter 56 could rotate about a different axis. In the present implementation, the drive pulley 62 is disposed on one side of the engine 24 and the motor-generator 144 and the recoil starter 56 are both disposed on the other side of the engine 24. It is contemplated the motor-generator and/or the recoil starter 56 could be disposed on the same side of the engine 24 as the drive pulley 62.

Figure 6:
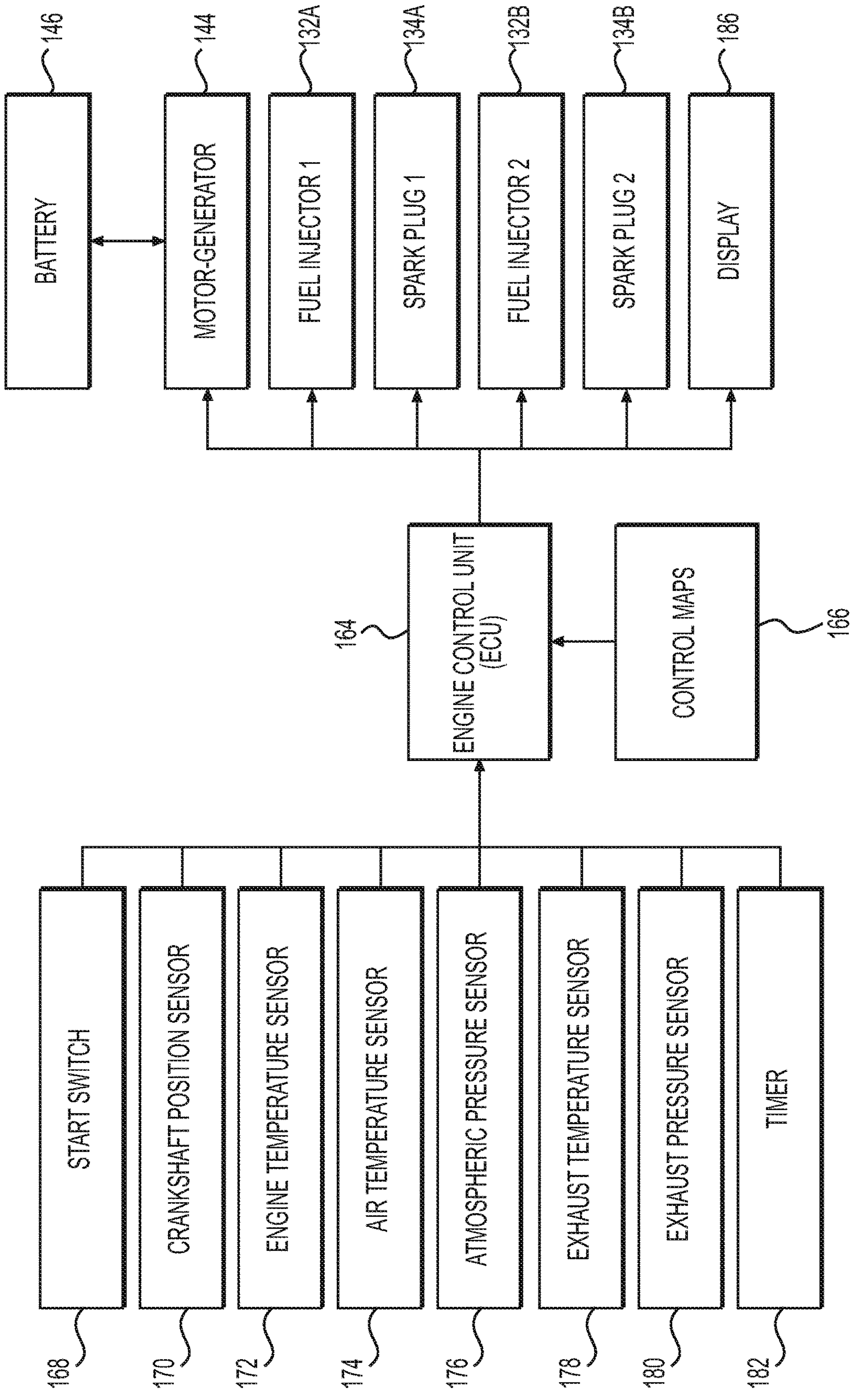
FIG. 6 is a schematic diagram of components of a starting system of the engine of FIG. 2.
Figure 7:
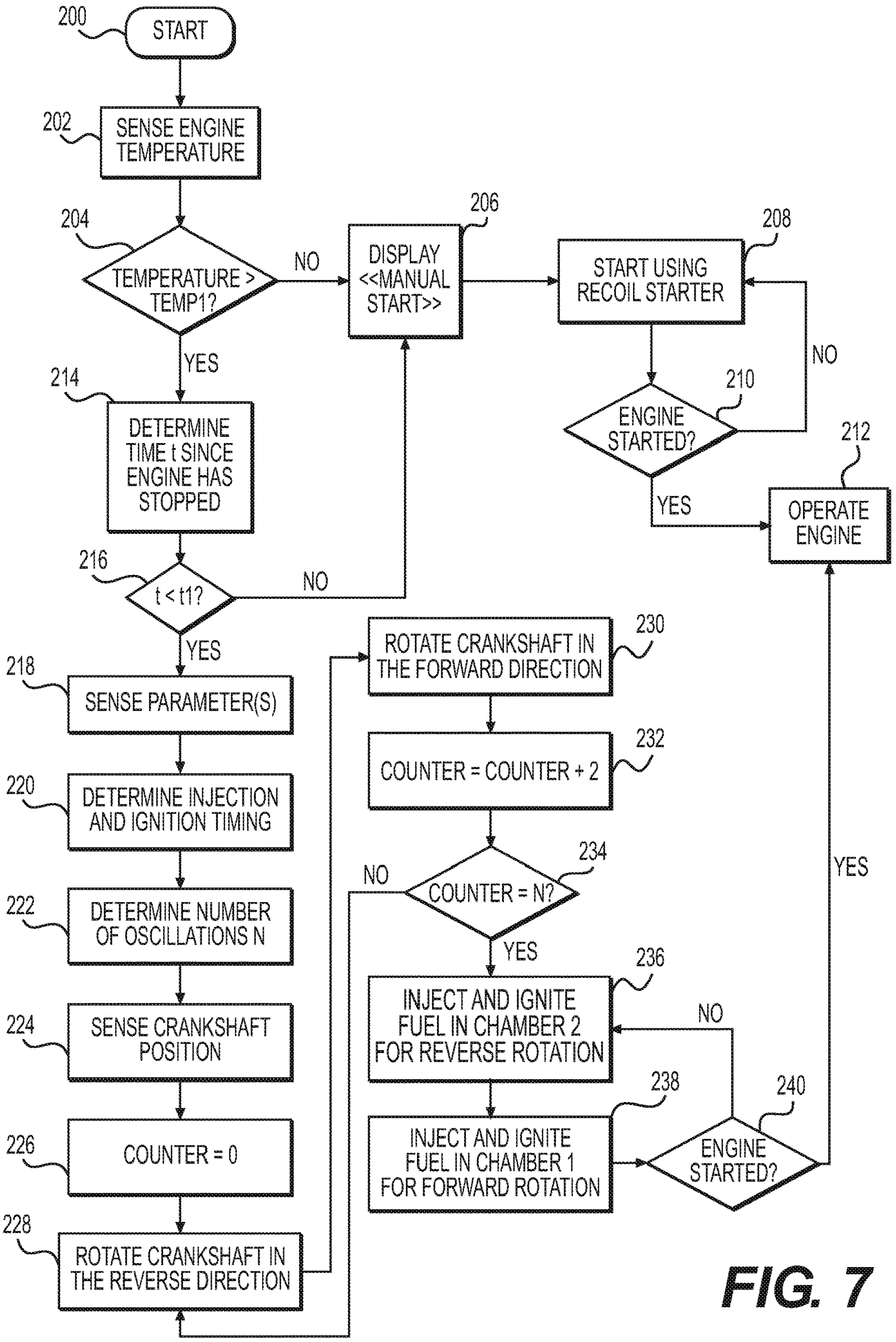
FIG. 7 is a logic diagram of a method for starting the engine of FIG. 2.

Turning now to FIG. 6, various components of a starting system of the engine 24 will be described. The control of the components used to start the engine 24 is done by an engine control unit (ECU) 164 as will be explained below. The ECU 164 is also used to control the operation of the engine 24 after it has started. Although a single ECU 164 is illustrated, it is contemplated that the various tasks of the ECU 164 could be split between various electronic modules. To initiate the starting sequence of the engine 24, the ECU 164 receives multiple inputs from the components disposed to the left of the ECU 164 in FIG. 6, which will be described below. Using these inputs, the ECU 164 obtains information from control maps 166 as to how the components disposed to the right of the ECU 164 in FIG. 6 should be controlled in order to start the engine 24. The control maps 166 are stored in an electronic data storage device, such as a hard disk drive or a flash drive. It is contemplated that instead of or in addition to the control maps 166, the ECU 164 could use control algorithms to control the components disposed to the right of the ECU 164 in FIG. 6. In the present implementation, the ECU 164 is connected with the various components illustrated in FIG. 6 via wired connections; however it is contemplated that it could be connected to one or more of these components wirelessly.

A start switch 168, provided on the snowmobile 10 on or near the handlebar 36, sends a signal to the ECU 164 that the user desires the engine 24 to start when it is actuated. The start switch 168 can be a push button, a switch actuated by a key, or any other type of device through which the user can provide an input to the ECU 164 that the engine 24 is to be started.

A crankshaft position sensor 170 is disposed in the vicinity of the crankshaft 100 in order to sense the position of the crankshaft 100. The crankshaft position sensor 170 sends a signal representative of the position of the crankshaft 100 to the ECU 164. In the present implementation, the crankshaft position sensor 170 is an absolute position sensor, such as a Hall Effect sensor for example. Based on the change in the signal received from the crankshaft position sensor 170, the ECU 164 is also able to determine a direction of rotation of the crankshaft 100. It is contemplated that the crankshaft position sensor 170 could alternatively sense the position of an element other than the crankshaft 100 that turns with the crankshaft 100, such as the rotor 150 of the motor-generator 144 for example, and be able to determine the position of the crankshaft 100 from the position of this element.

An engine temperature sensor 172 is mounted to the engine 24 to sense the temperature of one or more of the crankcase 102, the cylinder block 104, the cylinder head 108 and engine coolant temperature. The engine temperature sensor 172 sends a signal representative of the sensed temperature to the ECU 164.

An air temperature sensor 174 is mounted to the snowmobile 10, in the air intake system for example, to sense the temperature of the air to be supplied to the engine 24. The air temperature sensor 174 sends a signal representative of the air temperature to the ECU 164.

An atmospheric air pressure sensor 176 is mounted to the snowmobile 10, in the air intake system for example, to sense the atmospheric air pressure. The atmospheric air pressure sensor 176 sends a signal representative of the atmospheric air pressure to the ECU 164.

An exhaust temperature sensor 178 is mounted to the exhaust manifold 140 or another portion of an exhaust system of the snowmobile 10 to sense the temperature of the exhaust gases. The exhaust temperature sensor 178 sends a signal representative of the temperature of the exhaust gases to the ECU 164.

An exhaust pressure sensor 180 is mounted to the exhaust manifold 140 or another portion of an exhaust system of the snowmobile 10 to sense the pressure of the exhaust gases. The exhaust pressure sensor 180 sends a signal representative of the pressure of the exhaust gases to the ECU 164.

A timer 182 is connected to the ECU 164 to provide information to the ECU 164 regarding the amount of time elapsed since the engine 24 has stopped as will be described below. The timer 182 can be an actual timer which starts when the engine 24 stops. Alternatively, the function of the timer 182 can be obtained from a calendar and clock function of the ECU 164 or another electronic component. In such an implementation, the ECU 164 logs the time and date when the engine 24 is stopped and looks up this data to determine how much time has elapsed since the engine 24 has stopped when the ECU 164 receives a signal from the start switch 168 that the user desires the engine 24 to be started.

It is contemplated that one or more of the sensors 172, 174, 176, 178, 180, and the timer 182 could be omitted. It is also contemplated that one or more of the sensors 172, 174, 176, 178, 180, and the timer 182 could be used only under certain conditions. For example, the exhaust temperature and pressure sensors 178, 182 may only be used if the engine 24 has been recently stopped, in which case some exhaust gases would still be present in the exhaust system, or following the first combustion of a fuel-air mixture in one of the combustion chambers 120A, 120B.

The ECU 164 uses the inputs received from at least some of the start switch 168, the sensors 170, 172, 174, 176, 178, 180, and the timer 182 to retrieve one or more corresponding control maps 166 and to control the motor-generator 144, the fuel injectors 132A, 132B, and the spark plugs 134A, 134B using these inputs and/or the control maps 166 to start the engine 24, as the case may be. The inputs and control maps 166 are also used to control the operation of the engine 24 once it has started.

The ECU 164 is also connected to a display 186 provided on the snowmobile 10 near the handlebar 36 to provide information to the user of the snowmobile 10, such as engine speed, vehicle speed, oil temperature, and fuel level, for example.

Turning now to FIGS. 7 to 12, a method for starting the engine 24 will be described. The method begins at step 200 when the user of the snowmobile 10 actuates the start switch 168.

Following step 200, at step 202, the engine temperature sensor 172 senses the temperature of the engine 24 and sends a signal representative of this temperature to the ECU 164. At step 204, the ECU 164 compares the temperature sensed at step 202 to a predetermined engine temperature Temp1. In one implementation, the temperature Temp1 is −10° C., but other temperatures are contemplated. If the temperature sensed at step 202 is less than or equal to Temp1, from step 204 the method proceeds to step 206. At step 206, the ECU 164 sends a signal to the display 186 to display “Manual Start” or some other message to the user of the snowmobile 10 that the snowmobile 10 will need to be started manually using the recoil starter 156 (i.e. by pulling on the handle 163). It is contemplated that instead of providing a message on the display 186, that the ECU 164 could cause a sound to be heard or provide some other type of feedback to the user of the snowmobile 10 that the snowmobile 10 will need to be started manually using the recoil starter 156. From step 206, at step 208, in response to sensing the operation of the recoil starter 156 by the user of the snowmobile 10, the ECU 164 initiates an engine control procedure associated with the use of the recoil starter 156 in order to start the engine 24 using the recoil starter 156. Then at step 210, the ECU 164 determines if the engine 24 has been successfully started using the recoil starter 156. If not, then step 208 is repeated. It is also contemplated that if at step 210 it is determined that the engine 24 has not been successfully started, that the method could return to step 206 to display the message again. If at step 210 it is determined that the engine 24 has been successfully started, then the method proceeds to step 212. At step 212, the ECU 164 operates the engine 24 according to the control strategy or strategies to be used once the engine 24 has started.

If at step 204, the ECU 164 determines that the temperature sensed at step 202 is greater than Temp1, from step 204 the method proceeds to step 214. At step 214, the ECU 164 determines how much time “t” has elapsed since the engine 24 was last stopped using the timer 182 as described above. At step 216, the ECU 164 compares the time “t” determined at step 214 to a predetermined time “t1”. If the time “t” determined at step 214 is greater than or equal the predetermined time “t1”, then the method proceeds to step 206 and then proceeds from step 206 as described above. If at step 216 the ECU 164 determines that the time “t” determined at step 214 is less than the predetermined time “t1”, then the method proceeds to step 218. In one implementation, the predetermined time “t1” is 60 minutes, but other times are contemplated.

It is contemplated that steps 202 and 204 or steps 214 and 216 could be omitted. It is also contemplated that steps 214 and 216 could be performed before steps 202 and 204. It is also contemplated that steps 202 and 204 or steps 214 and 216 or all of steps 202, 204, 214, 216 could be omitted and be replaced with other steps used to determine if the condition of the engine 24 and/or the snowmobile 10 is suitable for starting the engine 24 using steps 218 to 240 described below or if the recoil starter 156 should be used instead. In such an implementation, these other steps would lead to step 218 if the conditions are suitable and to step 206 if they are not suitable. It is also contemplated that these other steps could be provided in addition to steps 202, 204, 214 and 216. For example, these other steps could be used to determine if the battery 146 is sufficiently charged to perform steps 218 to 240.

At step 218, the sensors 172, 174, 176, 178 and 180 sense their associated parameters and send their corresponding signals to the ECU 164. It is contemplated that only one or only some of the sensors 172, 174, 176, 178 and 180 could be used. It is also contemplated that other sensors for sensing other parameters could be used.

At step 220, based on the value of the parameters sensed at step 218, the ECU 164 determines the injection and ignition timing to be used at steps 236, 238 described below from the control maps 166. It is contemplated that control algorithms could be used instead of or in combination with the control maps 166. Although not indicated, the ECU 164 also determines the quantity of fuel to be injected using one or more of the parameters sensed at step 212. It is also contemplated that the ECU 164 could determine other factors relating to the control of the fuel injectors 132A, 132B and spark plugs 134A, 132B. For example, the ECU 164 could determine the number of time the spark plugs 134A, 132B should spark per injection event by the fuel injectors 132A, 132B. It is also contemplated, that the ECU 164 could determine the timing of multiple successive injection events per combustion event to be used at steps 236, 238.

From step 220, at step 222 based on the value of the parameters sensed at step 218, the ECU 164 determines the number of oscillations N of the crankshaft 100 necessary prior to the initial fuel injection and ignition at step 236 from the control maps 166. It is contemplated that control algorithms could be used instead of or in combination with the control maps 166 in order to determine the number of oscillations N of the crankshaft 100. For purposes of describing the present method, the value of the number of oscillations N will be selected to be four. FIGS. 8 to 12 illustrate the method where the number of oscillations N corresponds to four. It should be understood that the number of oscillations N could be selected to be two or more depending on the characteristics of the engine 24 and the value of the parameters sensed at step 218.

Figure 8:
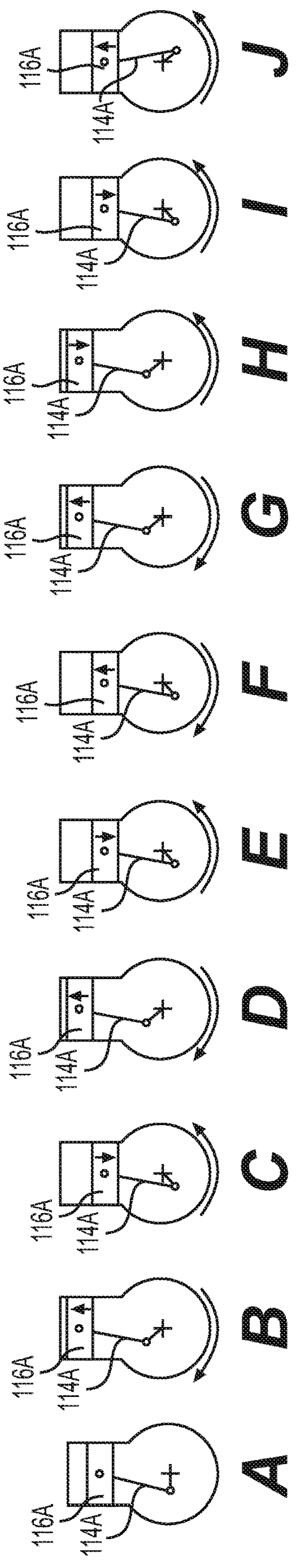
FIG. 8 illustrates positions of one piston of the engine of FIG. 2 resulting from an exemplary implementation of the method of FIG. 7.
Figure 9:
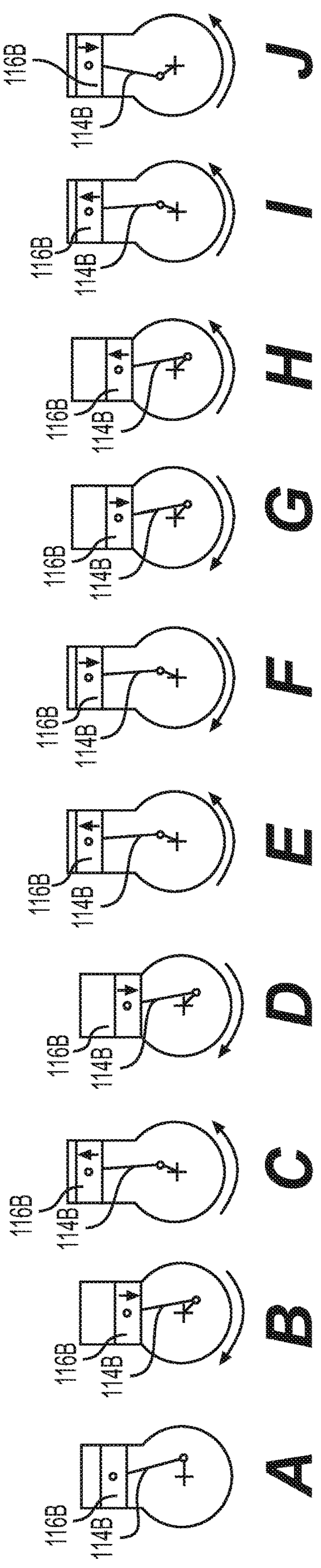
FIG. 9 illustrates positions of the other piston of the engine of FIG. 2 resulting from the exemplary implementation of the method of FIG. 7.
Figure 10:
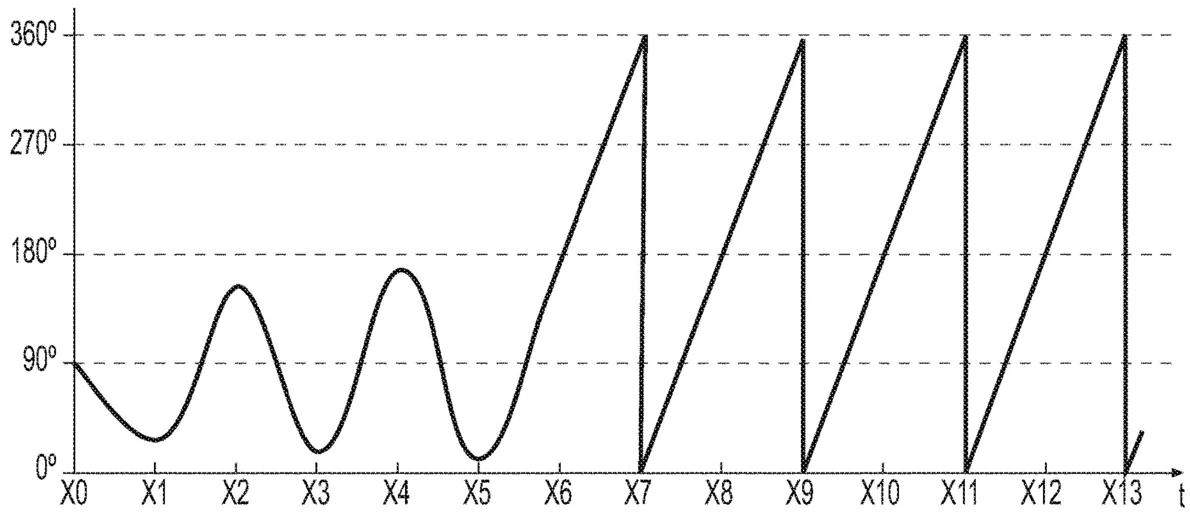
FIG. 10 illustrates the position of the crankshaft of the engine of FIG. 2 resulting from the exemplary implementation of the method of FIG. 7.

At step 224, the crankshaft position sensor 170 senses the current position of the crankshaft 100 and sends a signal corresponding to this position to the ECU 164. For purposes of explanation of the example illustrated in FIGS. 8 to 12, the position of the crankshaft 100 where the piston 116A is at its top dead center (TDC) position is set to correspond to the 0 degree (and 360 degree) position of the crankshaft 100. As would be understood, based on this reference position, when the piston 116B is at its TDC, and therefore the piston 116A is at its bottom dead center (BDC) position, the crankshaft 100 is at its 180 degree position. The number of degrees increases as the crankshaft 100 rotates in the forward direction. The forward direction of rotation of the crankshaft 100 corresponds to the direction in which the crankshaft 100 normally rotates to cause the snowmobile 10 to move forward. In vehicles provided with a transmission used to select between forward and rearward movement of the vehicle, the forward direction of rotation of the crankshaft 100 corresponds to the direction in which the crankshaft 100 normally rotates during forward operation of the vehicle. In FIGS. 8 and 9, the forward direction of rotation of the crankshaft 100 is illustrated by an arrow below the crankcase indicating a counter-clockwise rotation and the reverse direction of rotation of the crankshaft 100 is illustrated by an arrow below the crankcase indicating a clockwise rotation. In FIG. 10, the forward direction of rotation of the crankshaft 100 is illustrated by a positive slope (i.e. the number of degrees increasing over time) and the reverse direction of rotation of the crankshaft 100 is illustrated by a negative slope (i.e. the number of degrees decreasing over time). In the example illustrated in FIGS. 8 to 12, the engine 24 was stopped prior to performing the present method with the pistons 116A, 116B both halfway between their respective TDC and BDC positions. Therefore, at step 224 at time X0 (FIG. 10), the crankshaft 100 is at 90 degrees and the pistons 116A, 116B are in the positions shown at positions A in FIGS. 8 and 9 respectively.

Although not indicated elsewhere, starting at step 224 and throughout the following steps including step 212, the crankshaft position sensor 170 senses the position of the crankshaft 100 and sends a signal corresponding to this position to the ECU 164.

At step 226, the ECU 164 sets a counter to zero. The counter is used to count the number of oscillations that the crankshaft 100 makes in the following steps.

At step 228, the ECU 164 sends a signal to the motor-generator 144 to rotate the crankshaft 100 in the reverse direction as indicated by the clockwise arrow at positions B in FIGS. 8 and 9. As a result, the piston 116A moves toward its TDC position and the piston 116B moves toward its BDC position as shown in positions B in FIGS. 8 and 9. As the piston 116A moves toward its TDC position, exhaust gases still present in the combustion chamber 120A are exhausted through the exhaust ports 136A, 138A until the top of the piston 116A passes above the exhaust ports 136A, 138A. Once the top of the piston 116A passes above the exhaust ports 136A, 138A, the piston starts compressing the gases present in the combustion chamber 120A as it continues to move up toward its TDC position. The crankshaft 100 continues to be rotated in the reverse direction until the motor-generator 144 cannot overcome the compression in the combustion chamber 120A or shortly before. This corresponds to the position of the crankshaft 100 at time X1 in FIG. 10. This completes a first oscillation of the crankshaft 100. In the example illustrated, the crankshaft 100 is at about 25 degrees at time X1. It should be understood that depending on the initial positions of the crankshaft 100 and, therefore, of the pistons 116A, 116B, that the reverse rotation of the crankshaft 100 could result in the piston 116B moving toward its TDC position instead of the piston 116A moving towards its TDC position as described, and it should therefore be understood that in such a case the description of the following steps would be modified accordingly.

At step 230, at time X1, the ECU 164 sends a signal to the motor-generator 144 to rotate the crankshaft 100 in the forward direction as indicated by the counter-clockwise arrow at positions C in FIGS. 8 and 9 before the piston 116A has reached its TDC position as can be seen in FIG. 10. It is contemplated that the ECU 164 could send the signal to the motor-generator 114 to rotate crankshaft 100 in the forward direction shortly after time X1, thereby using the compression in the combustion chamber 120A to initially push down on the piston 116A and start turning the crankshaft 100 in the forward direction. As a result, the piston 116A moves toward its BDC position pushing fresh air from the crankcase 102 into the combustion chamber 120A through the corresponding scavenge ports 130 and the piston 116B moves toward its TDC position as shown in positions C in FIGS. 8 and 9. As the piston 116B moves toward its TDC position, exhaust gases still present in the combustion chamber 120B are exhausted through the exhaust ports 136B, 138B until the top of the piston 116B passes above the exhaust ports 136B, 138B. Once the top of the piston 116B passes above the exhaust ports 136B, 138B, the piston starts compressing the gases present in the combustion chamber 120B as it continues to move up toward its TDC position. The crankshaft 100 continues to be rotated in the forward direction until the motor-generator 144 cannot overcome the compression in the combustion chamber 120B or shortly before. This corresponds to the position of the crankshaft 100 at time X2 in FIG. 10. This completes a second oscillation of the crankshaft 100. In the example illustrated, the crankshaft 100 is at about 155 degrees at time X2.

Then at step 232, shortly after step 230 has been initiated but before it is completed, the ECU 164 increases the counter by two since two oscillations of the crankshaft 100 have occurred (i.e. at steps 228 and 230). Then at step 234, the ECU 164 determines if the counter is equal to the number of oscillations N determined at step 226. In the present example, since the number of oscillations N is four, the method returns to step 228.

At step 228, before the piston 116B reaches its TDC position, at time X2 the crankshaft 100 is rotated in the reverse direction by the motor-generator 144 until the motor-generator 144 cannot overcome the compression in the combustion chamber 120A or shortly before (positions D in FIGS. 8 and 9). This corresponds to the position of the crankshaft 100 at time X3 in FIG. 10. As a result, the piston 116B pushes fresh air from the crankcase 102 into the combustion chamber 120B again and the piston 116A pushes gases present in the combustion chamber 120A out of the combustion chamber 120A via the exhaust ports 136A and 138A. Due to the gain in momentum, the piston 116A is closer to its TDC position at time X3 than it was at time X1.

At step 230, before the piston 116A reaches its TDC position, at time X3 the crankshaft 100 is rotated in the forward direction by the motor-generator 144 until the motor-generator 144 cannot overcome the compression in the combustion chamber 120B or shortly before (positions E in FIGS. 8 and 9). This corresponds to the position of the crankshaft 100 at time X4 in FIG. 10. As a result, the piston 116A pushes fresh air from the crankcase 102 into the combustion chamber 120A again and the piston 116B pushes gases present in the combustion chamber 120B out of the combustion chamber 120B via the exhaust ports 136B and 138B. Due to the gain in momentum, the piston 116B is closer to its TDC position at time X4 than it was at time X2. Shortly after step 230 has been initiated for the second time, the counter is increased by two at step 232 and the counter is now at four. As a result, at step 234 the ECU 164 determines that the counter is equal to the number of oscillations N determined at step 226 (i.e. four) and the method proceeds to step 236.

It is contemplated that instead of initially rotating the crankshaft 100 in the reverse direction at step 228, that the crankshaft 100 could first be rotated in the forward direction at a step between steps 226 and 228. This oscillation of the crankshaft 100 would be followed by a step increasing the counter by one and the method would then proceed to step 228 as described above.

At step 236, the ECU 164 sends a signal to the fuel injector 132B to inject fuel in the combustion chamber 120B and a signal to the spark plug 134B to then ignite the fuel-air mixture in the combustion chamber 120B. These signals are based on the injection and ignition timing determined at step 220. The resulting explosion pushes down on the piston 116B (position F, FIG. 9) and therefore rotates the crankshaft 100 in the reverse direction. As can be seen with reference to FIGS. 10 and 12, in the present example, the fuel injection 14 occurs before time X4 as the piston 116B moves toward its TDC position and the ignition S4 occurs slightly after time X4 as the piston 116B moves away from its TDC position as a result of the compression in the combustion chamber 120B.

Then at step 238, around time X5 where the piston 116A reaches its closest position to its TDC (position G, FIG. 8), the ECU 164 sends a signal to the fuel injector 132A to inject fuel in the combustion chamber 120A and a signal to the spark plug 134A to then ignite the fuel-air mixture in the combustion chamber 120A. These signals are based on the injection and ignition timing determined at step 220. The resulting explosion pushes down on the piston 116A (position H, FIG. 8) and therefore rotates the crankshaft 100 in the forward direction. The piston 116A is closer to its TDC position at time X5 than it was at time X3 as can be seen in FIG. 10. As can be seen with reference to FIGS. 10 and 11, in the present example, the fuel injection 15 occurs before time X5 as the piston 116A moves toward its TDC position and the ignition S5 occurs slightly after time X5 as the piston 116A moves away from its TDC position as a result of the compression in the combustion chamber 120A.

Then at step 240, the ECU 164 determines if the engine 24 has started. If the engine 24 has not started, then the ECU 164 returns to step 236. If the engine 24 has started, then the ECU 164 proceeds to step 212. At step 212, the ECU 164 operates the engine 24 according to the control strategy or strategies to be used once the engine 24 has started. In the present implementation, the ECU 164 determines that the engine 24 has started if, as a result of the forward rotation of the crankshaft 100 resulting from the combustion in the combustion chamber 120A at step 238, the crankshaft 100 comes sufficiently close to 180 degrees (or passed 180 degrees) and with enough momentum to permit the following fuel injection in the combustion chamber 120B and the ignition of the resulting air fuel mixture to cause the crankshaft 100 to continue to rotate in the forward direction.

Figure 11:
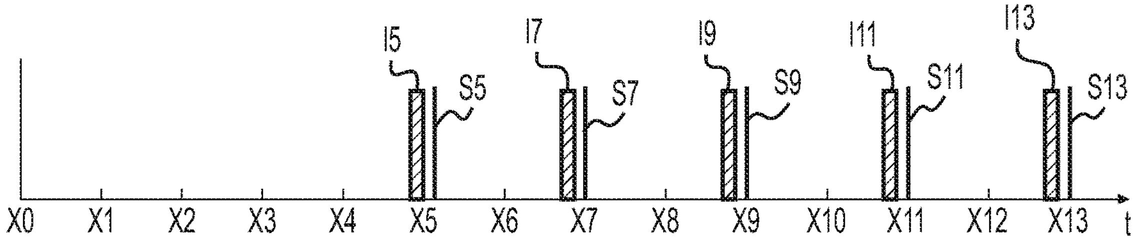
FIG. 11 illustrates the injection and ignition timing in one combustion chamber of the engine of FIG. 2 in relation to the crankshaft position of FIG. 10 resulting from the exemplary implementation of the method of FIG. 7.
Figure 12:
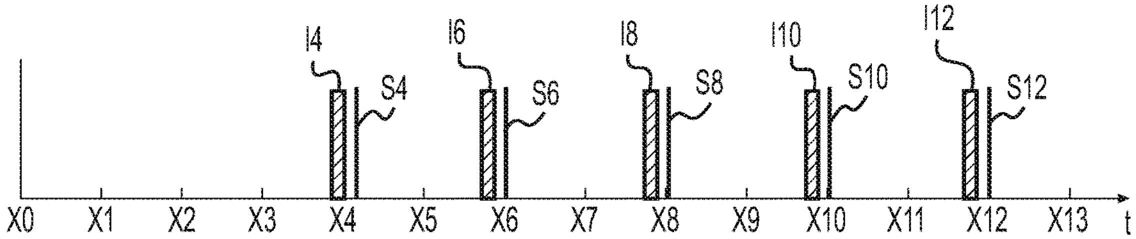
FIG. 12 illustrates the injection and ignition timing in the other combustion chamber of the engine of FIG. 2 in relation to the crankshaft position of FIG. 10 resulting from the exemplary implementation of the method of FIG. 7.

In the illustrated example, as a result of the injection IS and ignition S5, the piston 116B moves toward its TDC position (position I, FIG. 9) and has enough momentum that fuel injection 16 and ignition S6 (FIG. 12) around time X6 in the combustion chamber 120B result in the crankshaft 100 continuing to rotate in the forward direction as can be seen after time X6 in FIG. 10 and at positions J in FIGS. 8 and 9. As can be seen in FIGS. 10 to 12, the ECU 164 then continues to operate the engine 24 by alternating the fuel injection (17 to 113 in the figures) and ignition (S7 to S13 in the figures) events in the two combustion chambers 120A, 120B to continue to turn the crankshaft 100 in the forward direction.

It is contemplated that, should one of the pistons move towards its TDC position and have enough momentum following fuel injection and ignition in its corresponding combustion chamber to have the crankshaft 100 continue to rotate in the reverse direction, the ECU 164 could start the engine 24 in the reverse direction (i.e. with the crankshaft 100 turning in the reverse direction) and once the engine 24 is started, the ECU 164 could then apply an engine reversing control sequence to reverse the direction of rotation of the crankshaft 100 to the forward direction.

Although the times X0 to X13 corresponding to the various events described above are shown as being equidistant in FIGS. 10 to 12 for simplicity of illustration, it should be understood that the time between adjacent events gets shorter as the crankshaft 100 accelerates as a result of the engine 24 being started and then operated once started.

Modifications and improvements to the above-described implementations of the present technology may become apparent to those skilled in the art. For example, it is contemplated that the engine 24 could be provided with a decompression system. The decompression system can release pressure in the combustion chambers 120A, 120B, thereby reducing the compressions forces that need to be overcome by the motor-generator 144 at steps 228, 230 described above. Therefore, by providing a decompression system, it is contemplated that the motor-generator 144 could be even smaller and lighter. The foregoing description is intended to be exemplary rather than limiting. The scope of the present technology is therefore intended to be limited solely by the scope of the appended claims.

What is claimed is:

1. A vehicle comprising:

a frame having a tunnel, an engine cradle portion and a front suspension assembly portion;

a front suspension assembly connected to the front suspension assembly portion;

a pair of skis connected to the front suspension assembly;

an endless drive track disposed at least in part under the tunnel;

an internal combustion engine supported by the engine cradle portion and operatively connected to the endless drive track, the internal combustion engine comprising:

at least one cylinder;

at least one cylinder head connected to at least one cylinder;

at least one piston disposed in the at least one cylinder;

a crankshaft operatively connected to the at least one piston;

a crankcase housing at least a portion of the crankshaft;

a motor-generator comprising a rotor rotationally fixed to the crankshaft and a stator disposed around the crankshaft, the rotor and the stator being co-axial with the crankshaft, the rotor extending radially outward of the stator, the rotor partially housing the stator, the motor-generator being operable in motor mode to rotate the crankshaft about an axis and in generator mode to generate electricity;

a recoil starter selectively operatively connected to the rotor, the recoil starter operable to rotate the crankshaft via the rotor in a same direction as does the motor-generator in generator mode, the motor-generator being disposed between the recoil starter and the crankcase in a direction of the axis, at least a portion of the rotor being disposed between the recoil starter and the stator in the direction of the axis;

a drive pulley of a continuously variable transmission (CVT) operatively connected to the crankshaft, the motor-generator, the recoil starter, the crankshaft and the drive pulley being coaxial;

at least one sensor adapted for sensing at least one engine parameter; and an engine control unit receiving a signal from the at least one sensor, the engine control unit controlling a rotation of the crankshaft by one of the motor-generator and the recoil starter based on the signal received from the at least one sensor; and a display adapted for receiving a display signal sent by the engine control unit and for displaying a corresponding message, the display signal being sent in response to the signal being received by the engine control unit from the at least one sensor, the message being displayed when the crankshaft is to be rotated by the recoil starter.

2. The vehicle of claim 1, wherein the engine control unit sends a signal to the motor-generator to rotate the crankshaft only when the recoil starter is in a wound state.

3. The vehicle of claim 1, wherein the at least one engine parameter comprises an amount of time elapsed after stopping of the internal combustion engine, the display signal being sent when the amount of time is greater than a predetermined amount of time.

4. The vehicle of claim 1, wherein the at least one engine parameter comprises an engine temperature, the display signal being sent when the engine temperature is less than a predetermined temperature.

5. The vehicle of claim 1, wherein the motor-generator and the drive pulley are disposed on opposite sides of the crankcase.

6. The vehicle of claim 1, wherein the recoil starter and the drive pulley are disposed on opposite sides of the crankcase.

7. The vehicle of claim 1, further comprising a housing removably attached to the crankcase, the motor-generator being disposed at least in part inside the housing.

8. The vehicle claim 7, further comprising a cover mounted to an end of the housing opposite from the crankcase, the recoil starter being positioned between the cover and the motor-generator.

9. The vehicle of claim 1, wherein:

the recoil starter comprises a rope selectively wound on a reel, the reel being selectively operatively connected to the rotor; and an end of the crankshaft is disposed between the crankcase and at least a portion of the rope selectively wound on the reel, at least the portion of the rope selectively wound on the reel being offset from the end of the crankshaft.

10. The vehicle of claim 1, wherein:

the motor-generator operates in motor mode to rotate the crankshaft in a reverse direction and to rotate the crankshaft in a forward direction; and the recoil starter operates to rotate the crankshaft in the forward direction.

11. The vehicle of claim 1, wherein the at least one cylinder, the at least one cylinder head and the at least one piston define a variable volume combustion chamber therebetween, the internal combustion engine further comprising:

a fuel injector mounted to the cylinder head and adapted for injecting fuel in the variable volume combustion chamber when the crankshaft is rotating in a forward direction; and a spark plug adapted to ignite the fuel in the variable volume combustion chamber.

12. The vehicle of claim 1, wherein the motor-generator operates in generator mode when the crankshaft rotates in a forward direction.

13. The vehicle of claim 1, wherein the at least one engine parameter is selected from the group consisting of an engine temperature, an air intake temperature, an atmospheric air pressure, an exhaust temperature, an exhaust pressure and a time elapsed after stopping of the internal combustion engine.

14. The vehicle of claim 1, wherein:

the stator is in a fixed position relative to the internal combustion engine; and the recoil starter is adapted for engaging the rotor to simultaneously rotate the rotor and the crankshaft.

15. The vehicle of claim 14, wherein:

the recoil starter is adapted for rotating the rotor in the same direction as does the motor-generator in generator mode and for causing the motor-generator to operate in generator mode; and the motor-generator is adapted for rotating the crankshaft in motor mode in the same direction as in generator mode.

16. The vehicle of claim 1, wherein the motor-generator is further adapted to receive power from a capacitor for rotating the crankshaft in the same direction as in generator mode.

17. The vehicle of claim 1, wherein the recoil starter is selectively operatively connected to the rotor at a position radially offset from the crankshaft on the portion of the rotor.

* * * * *